(12) United States Patent
Ayachitula et al.

(10) Patent No.: US 7,509,627 B1
(45) Date of Patent: Mar. 24, 2009

(54) METHOD FOR MANAGEMENT OF DYNAMICALLY ALTERABLE LIFECYCLES IN STRUCTURED CLASSIFICATION DOMAINS

(75) Inventors: Naga A. Ayachitula, Elmsford, NY (US); Melissa J. Buco, Amawalk, NY (US); Lalitha P. Kamesam, Cortlandt Manor, NY (US); David M. Loewenstern, New York, NY (US); Larisa Shwartz, Scarsdale, NY (US); Christopher Ward, Glen Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/033,209

(22) Filed: Feb. 19, 2008

(51) Int. Cl.
*G06F 9/44* (2006.01)
(52) U.S. Cl. .................................................. 717/101
(58) Field of Classification Search .......... 717/100–103
See application file for complete search history.

(56) References Cited

U.S. PATENT DOCUMENTS

| | | | |
|---|---|---|---|
| 5,379,423 A * | 1/1995 | Mutoh et al. ................ 707/204 |
| 5,729,746 A * | 3/1998 | Leonard ..................... 717/101 |
| 6,535,975 B1 * | 3/2003 | Thompson et al. .............. 713/1 |
| 6,874,145 B1 * | 3/2005 | Ye et al. ..................... 718/108 |
| 6,901,578 B1 * | 5/2005 | Beaven et al. ................ 717/103 |
| 7,065,740 B2 * | 6/2006 | Westerinen et al. ......... 717/101 |
| 7,206,708 B2 * | 4/2007 | Williams et al. .............. 702/83 |
| 7,213,231 B1 * | 5/2007 | Bandhole et al. ............ 717/121 |
| 7,233,959 B2 | 6/2007 | Kanellos et al. |
| 7,257,812 B1 * | 8/2007 | Calder et al. ................ 718/100 |
| 7,310,801 B2 * | 12/2007 | Burkhardt et al. ........... 717/169 |
| 7,383,277 B2 * | 6/2008 | Gebhard et al. ............. 707/102 |
| 2003/0041131 A1 * | 2/2003 | Westerinen et al. ......... 709/221 |
| 2004/0034850 A1 * | 2/2004 | Burkhardt et al. ........... 717/120 |
| 2005/0022156 A1 * | 1/2005 | Schwan et al. .............. 717/102 |
| 2005/0171732 A1 * | 8/2005 | Williams et al. ............ 702/182 |
| 2006/0190922 A1 * | 8/2006 | Chen .......................... 717/100 |
| 2008/0034347 A1 * | 2/2008 | V et al. ...................... 717/101 |
| 2008/0066048 A1 * | 3/2008 | Hafermann et al. ......... 717/100 |

(Continued)

OTHER PUBLICATIONS

"IEEE Guide for Developing Software Life Cycle Processes," 1996, IEEE, p. 1-44.*

(Continued)

*Primary Examiner*—Wei Y. Zhen
*Assistant Examiner*—Qing Chen
(74) *Attorney, Agent, or Firm*—Cantor Colburn LLP; Lou Percello (57) ABSTRACT

A method for configuring multiple lifecycles, and associating each lifecycle with one or more subcategories of items includes receiving a request for a state change for an item in a current state; determining if the item's current state exists in the located lifecycle; wherein if the current state does not exist in the located lifecycle, the current state is updated with a series of update rules; determining if the current state has flags; wherein the flags are checked for one or more protection rules; generating a list of target states; receiving a user selected target state from the generated list; checking the selected target state for one or more associated protection rules; recording a state change for the selected target state in response to the satisfaction of the one or more associated protection rules, and if no protection rules are found; and propagating the state change.

2 Claims, 4 Drawing Sheets

U.S. PATENT DOCUMENTS

2008/0066049 A1* 3/2008 Jain et al. .................. 717/101
2008/0127089 A1* 5/2008 Peretz et al. ................ 717/122
2008/0208792 A1* 8/2008 Aikens et al. ................. 707/1

OTHER PUBLICATIONS

"IEEE Standard for Developing Software Life Cycle Processes," 1998, IEEE, p. 1-88.*

Costabile, Maria Francesca, "Usability in the software life cycle," 2000, World Scientific Publishing Company, p. 1-13.*

Spraragen, Susan L., "The Challenges in Creating Tools for Improving the Software Development Lifecycle," Jul. 2005, ACM, p. 1-3.*

Ward et al., "Integrated change and configuration management," 2007, IBM Systems Journal, p. 459-478.*

* cited by examiner

METHOD FOR MANAGEMENT OF DYNAMICALLY ALTERABLE LIFECYCLES IN STRUCTURED CLASSIFICATION DOMAINS

BACKGROUND OF THE INVENTION

1. Field of the Invention

The present invention relates generally to software, and more particularly, to a method for configuring multiple lifecycles, and associating each lifecycle with one or more subcategories of items whose descriptions are accessible in a database.

2. Description of the Related Art

Businesses, especially large-scale heterogeneous service-oriented businesses, manage a large number of different items that go through lifecycles composed of several clearly delineated states. Hardware assets may be specified, purchased, configured, deployed, and decommissioned; software may be designed, developed, tested, and installed; contracts may be negotiated, approved, and fulfilled. Businesses may manage these lifecycles by requiring approvals for items to enter or leave certain states, or they may require items in different states to be handled differently. Lifecycle issues are particularly critical in information technology (IT) service management, being a major component of accepted best practices for configuration management, as elaborated in the Information Technology Infrastructure Library (ITIL).

SUMMARY OF THE INVENTION

A method for configuring multiple lifecycles, and associating each lifecycle with one or more subcategories of items, the method includes: receiving a request for a state change for an item in a current state; wherein at least one of the following is carried out in response to the received request: locating a lifecycle associated with the item in response to the received request; wherein if the lifecycle is directly associated with the specific subcategory of the item located via a LifecycleAssignment table, then that lifecycle is used for the state change; wherein if the item's specific subcategory is a subcategory of a category associated with a lifecycle located via the LifecycleAssignment table, then the lifecycle of the most specific such category is used for the state change; determining if the item's current state exists in the located lifecycle; wherein in response to the determining, if the current state does not exist in the located lifecycle the current state is updated according to a series of update rules; determining if the current state has one or more flags associated with the located lifecycle; wherein the one or more flags are stored in a LifecycleState table; wherein in response to the determining, if there are one or more associated flags, the one or more flags are checked for one or more protection rules; generating a list of target states determined by a StateTransition table in response to at least one of the following: the satisfaction of the one or more protection rules, and if no protection rules are found; receiving a user selected target state from the generated list; checking the selected target state for one or more associated protection rules; recording a state change for the selected target state in response to at least one of the following: the satisfaction of the one or more associated protection rules, and if no protection rules are found; and propagating the state change.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method for configuring multiple lifecycles, and associating each lifecycle with one or more subcategories of items whose descriptions are accessible in a database.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Although the value of lifecycle management is widely acknowledged, current software tools for facilitating lifecycle management suffer from several deficiencies, and drawbacks associated therewith. Among the deficiencies of current lifecycle management tools include limitations of category choices, dynamic updating, and state propagation.

Many items require embedding into a complex configuration, where it is desirable to maintain a computer model of the configuration, in order to predict the effects that an alteration to the configuration will have, whether the alteration is due to planned changes or to unplanned events. For example, employees may be members of departments, and the movement of employee(s) to a new department may leave critical tasks under supported or staffed. In an additional example, software may be dependent upon layers of other software, where the patching of one software module may have unexpected consequences on other software components.

In a similar manner, many items undergo preplanned changes to their configuration during their useful lifecycle, requiring an information technology solution to manage the changes. Further examples include the hiring, training, and promotion of employees, and the purchase, deployment, and maintenance of physical assets. Nevertheless, existing software support tools for lifecycle management are specifically designed to handle only a single type of item, such as projects, data, or software. Even with the limitation of targeting a single type of item, existing software lifecycle management tools are unable to support subcategories of items with different lifecycles. For example, urgent projects may require streamlined handling, with fewer barriers to movement between states in a lifecycle. However, associating different subcategories with different lifecycles is not currently part of software lifecycle management tools.

An additional limitation of current lifecycle management software is the hard coding of the lifecycle directly into the software tool. A hard coded lifecycle requires stopping a system and reprogramming the lifecycle. Stopping the system is not only inefficient; in addition, the stopping makes it impossible to handle dynamically changing conditions in a seamless manner.

Finally, although lifecycle management is intimately linked to configuration and change management in the ITIL, current software solutions do not allow lifecycle state changes to be propagated automatically. Therefore, although the impact of changes in lifecycle state can be derived from a configuration and change database, the result of the impact in the form of forcing changes in lifecycle state to dependent items must be initiated manually.

Embodiments of the invention provide a software tool that enables a user to configure multiple lifecycles and associate each lifecycle with one or more subcategories of items whose descriptions are accessible in a database. The software tool enables the user to create, modify, delete, or reassign lifecycles to other subcategories. Each state within the lifecycle may also be created, modified or deleted, and the states may be annotated with access control flags.

Embodiments of the invention provide a method for management of lifecycles of hierarchically typed items or objects (hereafter referred to as items). The method matches an item to a lifecycle responsive to the type hierarchy, determines permitted target states from the lifecycle, selects from permitted target states, and propagates state changes. Whereby, the items lower in the hierarchy inherit the lifecycle of items higher in the hierarchy, unless superseded. Embodiments of the invention resolve an item's type (i.e., location in the hierarchy), and the item's type is matched against a list of types associated with each lifecycle. If no match exists and the type has a parent in the hierarchy, the type's parent is utilized to find a match from the list of types associated with each lifecycle. If the type has no parent and has no explicit match, the type is matched with a default lifecycle.

Embodiments of the invention provide a method for dynamically altering lifecycles. With embodiments of the invention, lifecycles may be added, deleted or modified. Item types may be reassigned from one lifecycle to another, even if there exist items of those types. If an item has a lifecycle state that does not exist in its newly matching lifecycle, the lifecycle state is matched against a table of lifecycle state mappings. If a match exists, the lifecycle state is replaced with the target of the mapping for that state, and the new lifecycle state is matched against the lifecycle state mappings, if necessary. If there is no match, a default rule is applied that maps the lifecycle state to a flagged lifecycle state of the newly matching lifecycle.

Embodiments of the invention provide a method for propagating lifecycle state changes among software representations of items linked by explicit relationships. In embodiments of the invention, lifecycle states may be given multiple flags, where the flag for an (source) items's current lifecycle state is matched against flags associated with explicit rules. If a rule matches, it is associated with an explicit relationship description linking the item to other items. If the target item may be transitioned to the same state as the source item, it is transitioned.

Embodiments of the invention provide a method where the requirements for transitioning an item from one lifecycle state to another are explicitly represented. Furthermore in embodiments of the invention, lifecycle states may be given multiple flags. The flag for an item's current lifecycle state is matched against flags associated with explicit rules. If a rule matches, it is associated with an explicit relationship description listing, and supporting documents or necessary configurations of objects are required prior to permitting changes to a lifecycle state. If all relationships are satisfied for all matching rules, the transition to the new lifecycle state is performed. The rules list actions to be performed if the relationship is not satisfied. Actions may be either a displayed message or a reference to a module where the user may add the missing documents or items.

Figure 1:
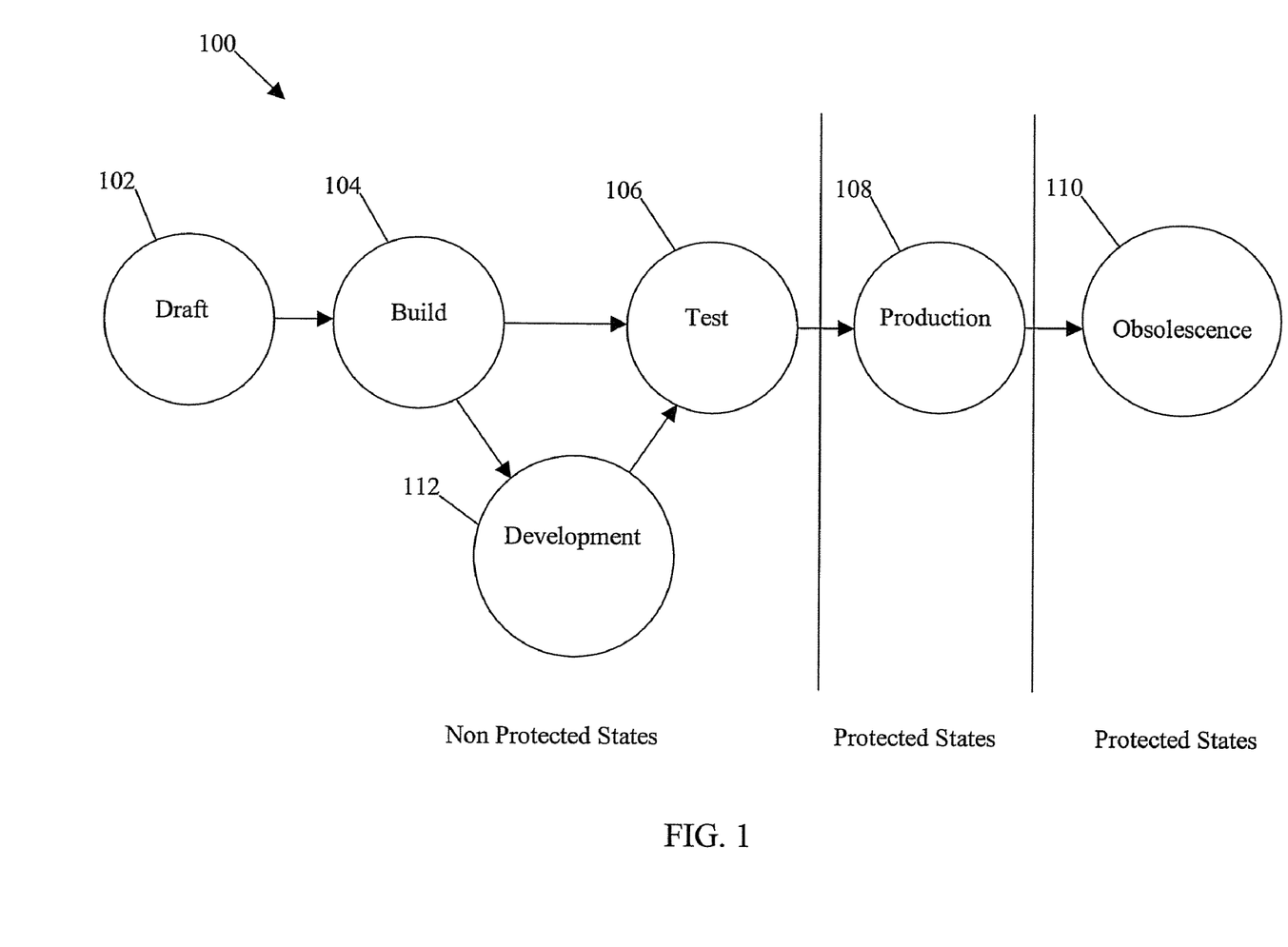
FIG. 1 illustrates a directed graph of a lifecycle having six labeled states, together with six transitions (represented by the connecting arrows) between the states.

FIG. 1 illustrates an exemplary directed graph 100 of a lifecycle comprised of six labeled states (102, 104, 106, 108, 110, 112), together with six transitions (represented by the connecting arrows) between the states (102, 104, 106, 108, 110, 112), according to an embodiment of the invention. The states represent the legal states for a particular category of item; the transitions represent operations on the items (e.g., approval, placed into service, etc.) that change the state of an item. States in a lifecycle may be flagged to associate the states with particular policies that provide restriction requirements that must be satisfied to enter or leave the state.

The four tables (Lifecycle, LifecycleState, LifecycleAssignment StateTransition) listed in Table 1 represent database tables for lifecycles and their components, and assignments. A lifecycle is a named entity that has a unique ID number as a primary key (PK). In relational database design, a primary key is a candidate key to uniquely identify each row in a table, A primary key comprises a single column or set of columns. No two distinct rows in a table can have the same value (or combination of values) in those columns. Depending on a table design, a table may have arbitrarily many unique keys, but at most one primary key. A foreign key (FK) is a referential constraint between two tables. The foreign key identifies a column or a set of columns in one (referencing) table that refers to a column or set of columns in another (referenced) table. The columns in the referencing table must form a primary key or unique key in the referenced table. The values in one row of the referencing columns must occur in a single row in the referenced table. Thus, a row in the referencing table may not contain values that do not exist in the referenced table. In this manner references can be made to link information together, and it is an essential part of database normalization. Multiple rows in the referencing table may refer to the same row in the referenced table. In most instances, it reflects the one (master table, or referenced table) to many (child table, or referencing table) relationship.

TABLE 1

| Lifecycle | LifecycleState |
| --- | --- |
| ID number (PK)<br>Name string<br>Is_default Boolean<br>Default_state number<br>(FK LifecyleState ID) | ID number (PK)<br>Lifecycle number (PK Lifecycle ID)<br>State String<br>Flags number |
| LifecycleAssignment | StateTransition |
| Lifecycle number<br>(FK Lifecycle ID)<br>Category number (FK) | Origin number<br>(FK LifecycleState ID)<br>Target number<br>(FK LifecycleState ID) |

Continuing with Table 1, lifecycles may be associated with categories through the LifecycleAssignment table. There may be as many as one lifecycle designated for each category. However, in most cases this is unnecessary since multiple categories may share a lifecycle (via entries in the LifecycleAssignment table). In cases where categories are arranged in a tree-structured hierarchy (with categories lower in the hierarchy considered to be subcategories of those above them), categories without entries in the LifecycleAssignment table are assumed to inherit the assignment of the closest ancestor with an entry in that table. If a situation arises where there are categories that neither are assigned a lifecycle explicitly nor inherit one implicitly, one lifecycle is designated the default lifecycle to be used for such cases.

A lifecycle is comprised of lifecycle states and transitions that are represented in the LifecycleState table and StateTransition table of Table 1, respectively. A lifecycle state is a named entity associated with a single lifecycle; and is associated with zero or more flags (represented as a binary number) that identify policies associated with the state. A state transition is an unnamed entity that maps origin states to target states in the same lifecycle. In addition, each lifecycle has one lifecycle state marked as the default state for the lifecycle. The default state is the state to which new items in categories associated (directly or indirectly) with the lifecycle are assigned when they are first created.

Figure 2:
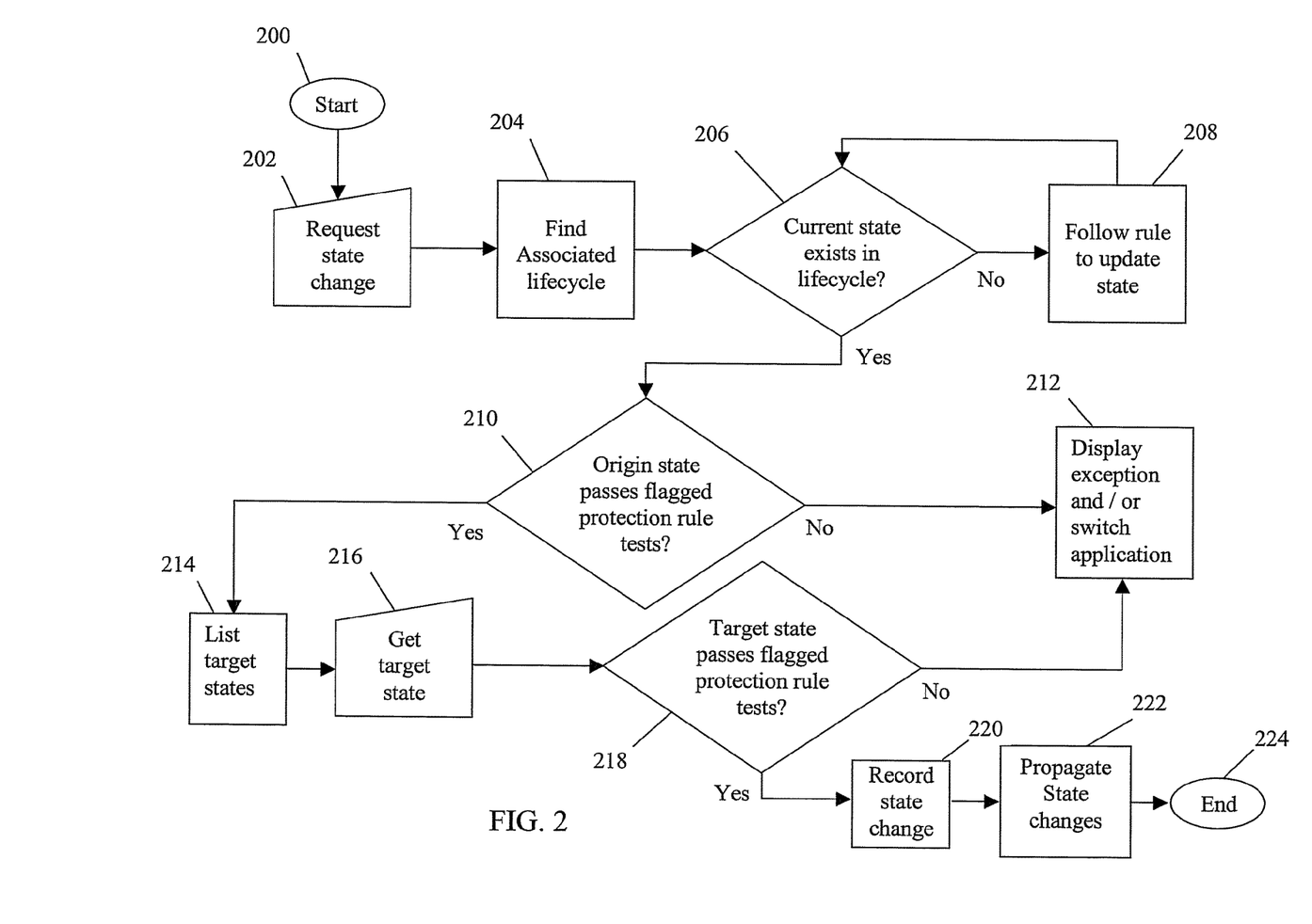
FIG. 2 shows a flowchart for a method for updating and managing states for an individual item per a state change request according to embodiments of the invention.

FIG. 2 shows a flowchart for a method for updating and managing states for an individual item per a state change request according to embodiments of the invention. The process starts (block 200), when a user requests a state change (block 202) for an item. In response to the user request, the lifecycle associated with the item is located (block 204). If a lifecycle is directly associated with the specific subcategory of the item via the LifecycleAssignment table (see Table 1), then that lifecycle is used. Otherwise, if the item's specific subcategory is a subcategory of a category associated with a lifecycle via the LifecycleAssignment table, then the lifecycle of the most specific such category is used. If no such category exists then the default lifecycle is used. Subsequently, a determination (decision block 206) if the item's current state exists in the lifecycle is made. It is noted that the current state of the item may not exist in the lifecycle due to changes in either the lifecycle or the item. Lifecycles may be created, edited, deleted, or reassigned, or items may be moved to new categories. If not (decision block 206 is No), then the state is updated according to the update rules (block 208) described later.

Continuing with FIG. 2, the current state, called the origin state, is checked against its lifecycle to see if there are any associated flags according to the LifecycleState table (decision block 210). If there are associated flags, then any protection rules associated with those flags are checked as described later. If all protection rules are satisfied (decision block 210 is Yes), or if none exists, then a list of possible target states as determined by the StateTransition table is generated (block 214) and the user is prompted to choose one (block 216). This selected target state is then also checked for its protection rules using the same mechanism used for the origin state (decision block 218). If all protection rules are satisfied (decision block 218 is Yes) or none exists, then the state change is recorded (block 220). A detailed description of how protection rules are satisfied is presented in FIG. 3. Following the recording of the state change (block 220), possible rule propagation may take place (block 222), and the process ends (block 224). In response to the origin state not passing the flagged protection rule tests (decision block 210 is no), or the target state not passing the flagged protection rule tests (decision block 218 is No), an exception is displayed and/or the application is switched (block 212).

An item may be associated with zero or more relationships to other items, and are stored in separate tables unrelated to the lifecycle system and are not listed in Tables 1 or Table 2 (to be described next). Relationships describe a connection between two items as well as a relationship type. In addition, multiple relationships may share a type. Examples of relationship types include "contains", "requires", "creates", etc. One of the primary purposes of a configuration management database is to maintain these relationships.

Table 2 illustrates the database tables for rules relating to state changes. The StatePropagationRule table of Table 2 facilitates state changes that propagate along relationships between items, assumed to be stored elsewhere in the database. One example of a relationship is containment, such as the relationship between a computer server and disk drives mounted in the server. The StatePropagationRule table is used to propagate state changes along specified relationships, so that for example, taking a server offline (e.g., by changing its state to something other than "production") may cause contained items such as its drives to be marked as unavailable by changing their state appropriately. A row of the StatePropagation table is interpreted as if the item is associated with the Lifecycle specified in the row, and the target state to which the item has transitioned is flagged with the flag listed in the row, then any relationships of the type relationship listed in the row from the item to an item associated with the RelatedLifecycle that are in the OriginState are transitioned to the TargetState. Transitioning occurs using the method described in FIG. 3, which is a simplified version of the method described in FIG. 2. All propagations are considered to be performed simultaneously, and the process is checked to prevent cycles.

TABLE 2

| StatePropagationRule | ProtectionRule |
|---|---|
| Lifecycle number (FK lifecycle ID) Flag number Relationship (FK) RelatedLifecycle number (FK lifecycle ID) OriginState number (FK lifecycle ID) TargetState number (FK lifecycle ID) | Lifecycle number (FK lifecycle ID) Flag number Test (FK) Application (FK) Exception string |

| UpdateRule |
|---|
| Origin number (FR LifecycleState ID) Target number (FR LifecycleState ID) |

Figure 3:
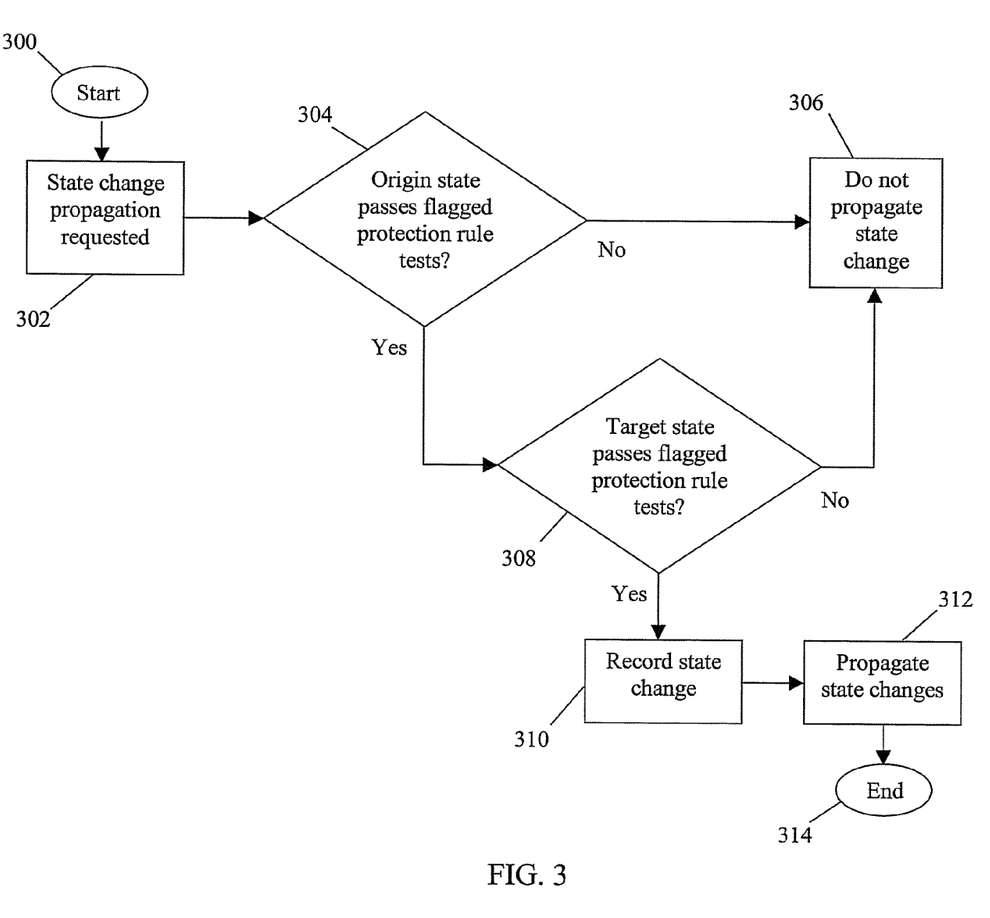
FIG. 3 shows a flowchart for a method for automated state change propagation according to embodiments of the invention.

FIG. 3 shows a flowchart for a method for automated state change propagation according to embodiments of the invention. The process starts (block 300) with a request for a state change to be propagated (block 302). If the origin state does not pass the flagged protection rule test (decision block 304 is No) the state change is not propagated (block 306). If the origin state passes the flagged protection rule test (decision block 304 is Yes), the target state is also tested versus the flagged protection rules (decision block 308). If the target state does not pass the flagged protection rule test (decision block 308 is No) the state change is not propagated (block 306). However, in response to the target state passing the flagged protection rule test (decision block 308 is Yes), the state change is recorded (block 310), and the state changes are propagated (block 312) and the method concludes (block 314).

When an item is discovered to be in a current state that does not exist in its associated lifecycle, one or more update rules are applied to correct the state. An item's current state may not be in its associated lifecycle because the item's category has changed, the item's original lifecycle has been edited or deleted, or even because a category containing the subcategory of the item has been assigned to a different lifecycle. The process for updating the lifecycle is a breadth-first search through the UpdateRule table (shown in Table 2). In the breadth-first search, all rows of UpdateRule for which the origin matches the item's current state are selected. Based on this selection, all rows for which the target state is associated (via the LifecycleState table) with the item's current lifecycle are selected. If this new selection is not empty, it replaces the selection. The target states from the selection, if any, are added to a list of states, which is initially empty, and any duplicates are removed. If the list of states is now empty, the process is stopped and an error is reported. The next element of the list of states replaces the item's current state. If the item's current state is now in the item's associated lifecycle, the process is stopped and the state change is recorded. Otherwise, the list is repeated.

Lifecycle states may be associated with protection rules; such states are called protected states. For example, in FIG. 1 the state labeled "Production" (108) is considered a protected state. A state is protected if its flags contain (bitwise AND) the flag of any row of ProtectionRule and their Lifecycle fields match. Each row of ProtectionRule is a protection rule. Each protection rule includes a test ID and an exception, and optionally the ID of an application. The tests corresponding to the test IDs are stored SQL (structured query language) queries that may examine the contents of the fields of the item whose state triggered the protection rule. SQL is a database computer language designed for the retrieval and management of data in relational database management systems (RDBMS), database schema creation and modification, and database object access control management. SQL is a standard interactive and programming language for querying and modifying data and managing databases.

The tests may also examine the item's relationships and the fields associated with items to which it has a relationship. The lifecycle state passes the test if there is some entry in the database that matches the SQL query. If a lifecycle state does not pass the test, then the given exception is signaled to the user. If the protection rule contains a pointer to an application, that application is run, permitting the user to create or modify fields and relationships for the item, and then the test is run again. This process enables the lifecycle designer to force a user to supply missing information for an item or related items. A browser based editor provides a user with a method for creating, editing, and assigning lifecycles and rules through a graphical user interface (GUI).

Figure 4:
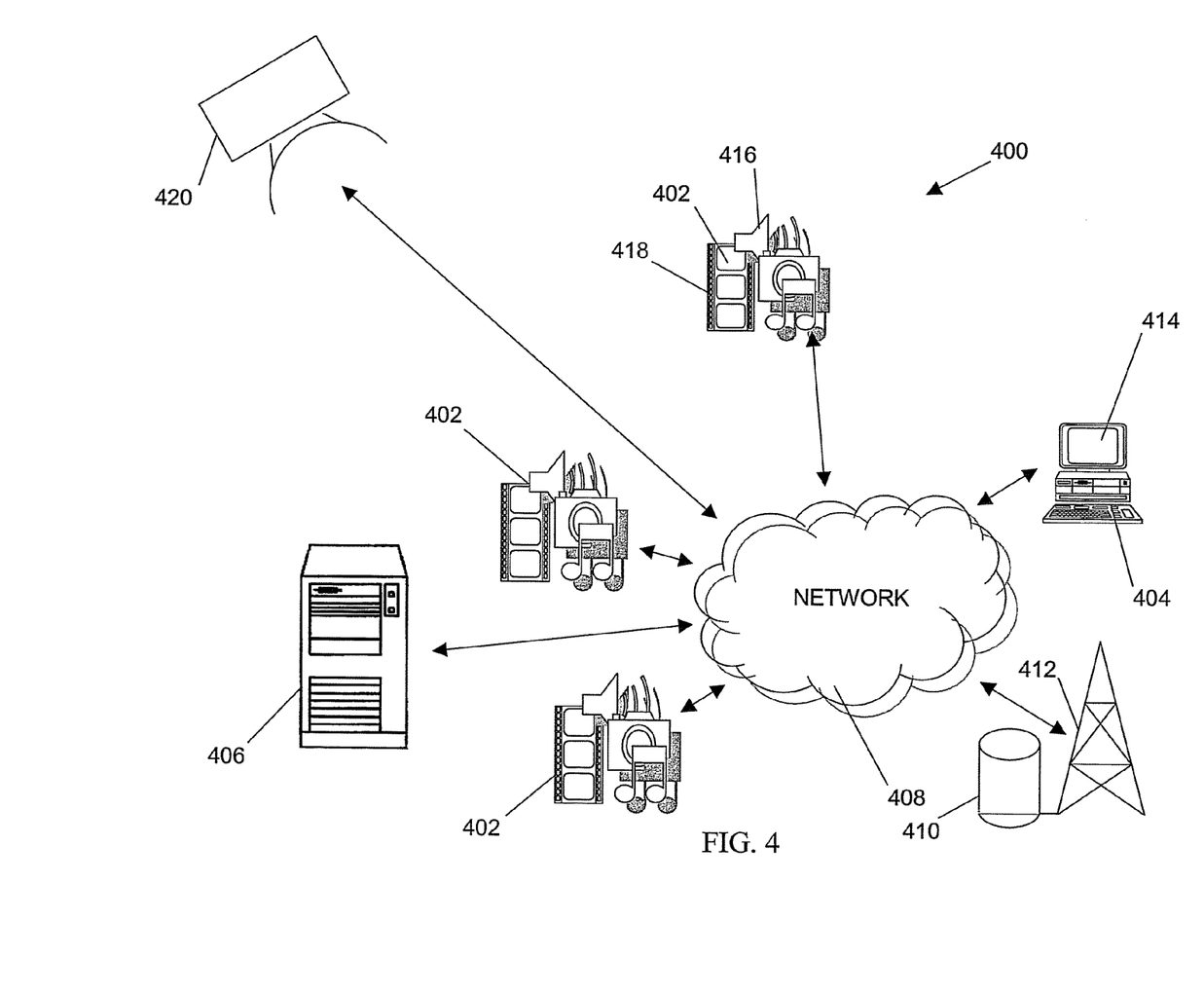
FIG. 4 illustrates an exemplary system for configuring multiple lifecycles, and associating each lifecycle with one or more subcategories of items whose descriptions are accessible in a database.

FIG. 4 illustrates an exemplary system 400 for implementing a software tool that enables a user to configure multiple lifecycles and associate each lifecycle with one or more subcategories of items whose descriptions are accessible in a database according to embodiments of the invention. The system 400 includes remote devices in the form of multimedia devices 402, and desktop computer devices 404 configured with display capabilities 414 for implementing graphical user interface (GUI) aspects of the invention described herein. The multimedia devices 402 may be mobile communication and entertainment devices, such as cellular phones and mobile computing devices that are wirelessly connected to a network 408. The multimedia devices 402 have video displays 418 and audio outputs 416 for implanting the GUI described herein. The network 408 may be any type of known network including a fixed wire line network, cable and fiber optics, over the air broadcasts, satellite 420, local area network (LAN), wide area network (WAN), global network (e.g., Internet), intranet, etc. with data/Internet capabilities as represented by server 406. Communication aspects of the network are represented by cellular base station 410 and antenna 412.

Software for carrying out features of embodiments of the invention may be resident on the individual multimedia devices 402 and desktop computers 404, or stored within the server 406 or cellular base station 410.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for configuring multiple software lifecycles, and associating each software lifecycle with one or more subcategories of software items, the computer-implemented method comprising:
   receiving a request for a state change for a software item in a current state;
   locating a software lifecycle associated with the software item in response to the received request;
   wherein in the event the software lifecycle is directly associated with a specific subcategory of software item located via a LifecycleAssignment table, then that specific subcategory of software item is used for the state change;
   wherein in the event the software item's specific subcategory is a subcategory of a category associated with a software lifecycle located via the LifecycleAssignment table, then the software lifecycle of the most specific of such subcategory is used for the state change;
   determining if the software item's current state exists in the located software lifecycle;
   wherein in response to the determining, if the current state does not exist in the located software lifecycle, the current state is updated according to a series of update rules;
   wherein in response to the determining, if the current state does not exist in the located software lifecycle, then determining if the current state has one or more flags associated with the located software lifecycle;

wherein the one or more flags are stored in a LifecycleState table;

wherein in response to the determining, in the event there are one or more associated flags, the one or more associated flags are checked for one or more protection rules;

generating a list of target states determined by a StateTransition table in response to at least one of the following: the satisfaction of the one or more protection rules, and if no protection rules are found;

receiving a user selected target state from the generated list;

checking the selected target state for one or more associated protection rules;

recording a state change for the selected target state in response to at least one of the following: the satisfaction of the one or more associated protection rules, and if no protection rules are found;

propagating the state change; and wherein in response to the current state or the selected target state not satisfying their respective one or more protection rules, at least one of the following occurs: an exception is displayed and an application is switched;

wherein the LifecycleAssignment table, LifecycleState table, and StateTransition table are stored in a relational database;

wherein the current state is protected if the current state's flags contain a flag of the one or more protection rules from a row in a ProtectionRule table of the relational database;

wherein the one or more protection rules further comprise a test ID, an exception, and an ID of an application;

wherein the test ID is stored SQL (structured query language) queries that examine the contents of a series of fields related to the software item whose state triggered the one or more protection rules.

2. The computer-implemented method of claim 1, wherein the series of update rules are obtained by:

conducting a breadth-first search of an UpdateRule table in the relational database;

selecting all rows in the UpdateRule table corresponding to the current state; and wherein the selecting is based on information in the LifecycleState table.

* * * * *